United States Patent
Kim et al.

(10) Patent No.: US 12,519,221 B2
(45) Date of Patent: Jan. 6, 2026

(54) COMMUNICATION MODULE

(71) Applicant: LG ELECTRONICS INC., Seoul (KR)

(72) Inventors: Doojung Kim, Seoul (KR); Seungmin Woo, Seoul (KR); Dongwan Roh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 334 days.

(21) Appl. No.: 18/255,288

(22) PCT Filed: Dec. 6, 2021

(86) PCT No.: PCT/KR2021/018394
§ 371 (c)(1),
(2) Date: May 31, 2023

(87) PCT Pub. No.: WO2022/124743
PCT Pub. Date: Jun. 16, 2022

(65) Prior Publication Data
US 2024/0006758 A1  Jan. 4, 2024

(30) Foreign Application Priority Data
Dec. 11, 2020 (KR) .................. 10-2020-0173587

(51) Int. Cl.
*H01Q 1/52* (2006.01)
*H01Q 9/04* (2006.01)
(Continued)

(52) U.S. Cl.
CPC ........... *H01Q 1/526* (2013.01); *H01Q 9/0421* (2013.01); *H04B 1/0064* (2013.01); *H04B 1/40* (2013.01); *H01Q 1/2291* (2013.01)

(58) Field of Classification Search
CPC .... H01Q 1/526; H01Q 1/2291; H01Q 9/0421; H04B 1/0064; H04B 1/40
See application file for complete search history.

(56) References Cited

U.S. PATENT DOCUMENTS

2007/0182647 A1 * 8/2007 Li .................. H01Q 9/0464
                                                343/702
2014/0242903 A1   8/2014 DeLuis et al.
(Continued)

FOREIGN PATENT DOCUMENTS

KR     10-1563459        10/2015
KR   10-2015-0122746     11/2015
(Continued)

OTHER PUBLICATIONS

PCT International Application No. PCT/KR2021/018394, International Search Report dated Mar. 11, 2022, 5 page.

*Primary Examiner* — Junpeng Chen
(74) *Attorney, Agent, or Firm* — LEE, HONG, DEGERMAN, KANG & WAIMEY

(57) ABSTRACT

A communication module according to the present embodiment comprises: a substrate in which a ground shield protrudes from a main body; at least one communication chip provided in the main body; a first antenna having a first feeding unit and a first ground that are connected to the main body; and a second antenna which has a second feeding unit and a second ground that are connected to the main body, and which is spaced from the first antenna, wherein the ground shield protrudes between the first antenna and the second antenna, and at least one hole can be formed in the ground shield.

10 Claims, 9 Drawing Sheets

(51) Int. Cl.
  *H04B 1/00* (2006.01)
  *H04B 1/40* (2015.01)
  *H01Q 1/22* (2006.01)

(56) References Cited

U.S. PATENT DOCUMENTS

| | | |
|---|---|---|
| 2016/0226139 A1 | 8/2016 | Yu et al. |
| 2019/0027833 A1* | 1/2019 | Ayala Vazquez ...... H01Q 5/342 |
| 2019/0081615 A1* | 3/2019 | Edwards ............... H03J 1/0083 |
| 2019/0081694 A1* | 3/2019 | Zhou ...................... H05K 1/028 |
| 2019/0103661 A1* | 4/2019 | Cousins ................. H01Q 1/273 |
| 2019/0341688 A1 | 11/2019 | Kim et al. |
| 2020/0076080 A1 | 3/2020 | Liu et al. |
| 2020/0303805 A1 | 9/2020 | Ryoo et al. |
| 2022/0393705 A1* | 12/2022 | Lee ....................... H04M 1/026 |

FOREIGN PATENT DOCUMENTS

| | | |
|---|---|---|
| KR | 10-1792415 | 11/2017 |
| KR | 10-2019-0110508 | 9/2019 |
| KR | 10-2019-0127455 | 11/2019 |
| KR | 10-2108684 | 5/2020 |
| KR | 10-2020-0111125 | 9/2020 |
| KR | 10-2021-0049978 | 5/2021 |

\* cited by examiner (a)          (b)          (c)

COMMUNICATION MODULE

CROSS-REFERENCE TO RELATED APPLICATIONS

This application is the National Stage filing under 35 U.S.C. 371 of International Application No. PCT/KR2021/018394, filed on Dec. 6, 2021, which claims the benefit of earlier filing date and right of priority to Korean Application No. 10-2020-0173587, filed on Dec. 11, 2020, the contents of which are all hereby incorporated by reference herein in their entireties.

TECHNICAL FIELD

The present invention relates to a communication module.

BACKGROUND ART

A communication module may be a portion of a router, communicate with home appliances such as washing machines or refrigerators, or communication devices such as portable terminals, and the communication module may comprise an antenna device for communication.

An example of an antenna device according to the related art is disclosed in Korean Patent Publication No. 10-2019-0110508 A (Sep. 30, 2019) and comprises a dielectric layer, a plurality of first transparent electrode disposed on a first surface of the dielectric layer and having transparency corresponding to a predetermined first value, a second transparent electrode disposed on a second surface of the dielectric layer and having transparency corresponding to a predetermined second value, and a transparent isolation element having transparency corresponding to a predetermined third value and configured to remove mutual coupling between at least two first transparent electrodes of the plurality of transparent electrodes, wherein the transparent isolation element may be a metallic element periodically disposed between the plurality of first transparent electrodes.

The antenna device as described above has to be designed so that the metallic element blocks a specific frequency band, and the antenna device including the metallic element has a limitation in that the antenna device is capable of being used only in a limited band.

DISCLOSURE OF THE INVENTION

Technical Problem

An object of the present invention is to provide a communication module capable of minimizing a phenomenon in which a signal between a first antenna and a second antenna, which are connected to a substrate, serves as an interferer.

Technical Solution

A communication module according to the present embodiment includes: a substrate in which a ground shield protrudes from a main body; at least on communication chip installed on the main body; a first antenna provided with a first feeding unit and a first ground, which are connected to the main body; and a second antenna provided with a second feeding unit and a second ground, which are connected to the main body, the second antenna being spaced apart from the first antenna, wherein the ground shield protrudes between the first antenna and the second antenna, and at least one hole is defined in the ground shield.

The first feeding unit and the second feeding unit may be perpendicular to each other.

A direction in which the first feeding unit and the first ground are spaced apart from each other may be perpendicular to a direction in which the second feeding unit and the second ground are spaced apart from each other.

The first ground may be disposed between the first feeding unit and the second antenna.

At least one of the first antenna or the second antenna may include a PIFA having a void therein.

The main body may include: a first feeding unit connection portion to which the first feeding unit is connected; and a second feeding unit connection portion to which the second feeding unit is connected, wherein at least one of the first feeding unit connection portion or the second feeding unit connection portion may include a fill-cut microstrip line.

The microstrip line may be provided by a first layer, a second layer, and a third layer, wherein the first layer may be disposed on a top surface of the substrate, the second layer may have a void therein and is disposed on a top surface of the first layer, and the third layer may be disposed on a top surface of the second layer, wherein upper and lower sides of the void may be blocked by the first layer and the third layer, respectively.

At least one of the first antenna or the second antenna may include: a high frequency transceiver which has a first width and in which the void is defined; and a low frequency transceiver having a second width less than the first width, wherein a fill-cut region may be defined between the high frequency transceiver and the low frequency transceiver.

The hole may be closer to an edge of the ground shield of a center of the ground shield and the edge of the ground shield.

The hole may be provided in plurality, which are spaced apart from each other. The plurality of hole may be disposed in a line.

Advantageous Effects

According to the present embodiment, the degree of isolation between the first antenna and the second antenna, which are connected to the substrate, may be improved, and the phenomenon in which the signal between the first antenna and the second antenna serves as the interferer may be minimized.

MODE FOR CARRYING OUT THE INVENTION

Hereinafter, detailed embodiments will be described in detail with reference to the accompanying drawings.

Figure 1:
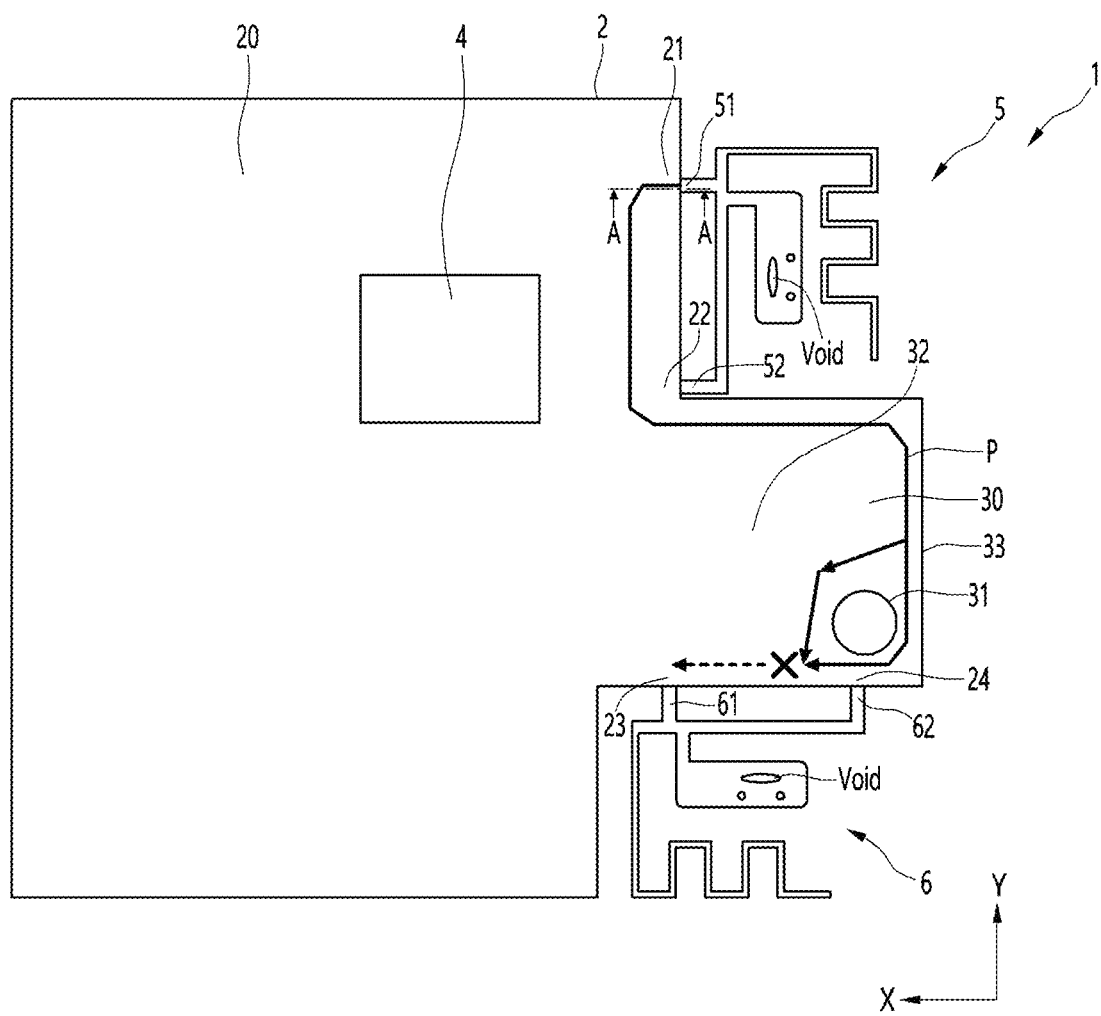
FIG. 1 is a view illustrating an example of a communication module according to the present embodiment.

FIG. 1 is a view illustrating an example of a communication module according to the present embodiment.

A communication module 1 may comprise a substrate 2, at least one communication chip 4, a first antenna 5, and a second antenna 6.

The substrate 2 may comprise a main body 20 and a ground shield 30, and the ground shield 30 may integrally protrude from the main body 20.

At least one communication chip 4 may be installed on the main body 20. At least one communication chip 4 may be disposed on a top surface of the main body 20.

An example of the at least one communication chip 4 may be a communication chip combining Wi-Fi and Bluetooth and may be integrated.

Another example of the at least one communication chip 4 may include a Wi-Fi communication chip and a Bluetooth communication chip. The Wi-Fi communication chip and the Bluetooth communication chip may be installed on the main body 20 so as to be spaced apart from each other.

In the first antenna 5, the first feeding unit 51 and the first ground 52 may be connected to the main body 20.

In the second antenna 6, the second feeding unit 61 and the second ground 62 may be connected to the main body 20. The second antenna 6 may be spaced apart from the first antenna 5.

Any one of the first antenna 5 and the second antenna 6 may be a Wi-Fi antenna, the other one of the first antenna 5 and the second antenna 6 may be a Bluetooth (BT) antenna, and the communication module 1 may be a module in which the Wi-Fi antenna and the Bluetooth antenna are connected to one substrate 2.

The communication module 1 may be a portion of a router and may perform Wi-Fi communication or Bluetooth communication with home appliances such as washing machines or refrigerators or communication devices such as portable terminals.

At least one of the first antenna 5 or the second antenna 6 may be a planar inverted F antenna (PIFA) in which a void is formed, and a degree of isolation between the first antenna 5 and the second antenna 6 may be minimized.

The first antenna 5 and the second antenna 6 may be different types.

The first antenna 5 and the second antenna 6 may have the same type, and both the antennas 5 and 6 may be the planar inverted F antennas (PIFAs). Each of the first antenna 5 and the second antenna 6 may be the PIFA in which the void is formed.

The main body 20 may be an antenna connection body to which the first antenna 5 and the second antenna 6 are connected. The main body 20 may have a polygonal shape, and the shape of the main body 20 may be determined according to the shapes of the first antenna 5 and the second antenna 6. The first antenna 5 and the second antenna 6 may be connected together to one side of left and right sides of the main body 20.

The main body 20 may include a first feeding unit connection portion 21 to which the first feeding unit part 51 is connected and a first ground connection portion 22 to which the first ground 52 is connected.

The main body 20 may include a second feeding unit connection portion 23 to which the second feeding unit part 61 is connected, and a second ground connection portion 24 to which the second ground 62 is connected.

The ground shield 30 may protrude between the first antenna 5 and the second antenna 6. The ground shield 30 may be disposed between the first antenna 5 and the second antenna 6. The first antenna 5 and the second antenna 6 may be spaced apart from each other in a front and rear direction Y with the ground shield 30 therebetween.

At least one hole 31 may be formed in the ground shield 30. When the first antenna 5 and the second antenna 6 are separated from each other by the ground shield 30, and at least one hole 31 is formed in the ground shield 30, a current path P flowing through the ground shield 30 may be adjusted. The hole 31 may be defined closer to an edge 33 of edges 33 of the ground shield 30 of a center 32 of the ground shield 30 and the edge 33 of edges 33 of the ground shield 30.

In the communication module 1, the first antenna 5 and the second antenna 6 may have different polarizations, and a spaced distance between the first feeding unit 51 of the first antenna 5 and the second feeding unit 61 of the second antenna 6 may increase to improve the degree of isolation of the antenna.

The first feeding unit 51 and the second feeding unit 61 may be orthogonal to each other. The first feeding unit 51 may be disposed to be elongated in the left and right direction X, and the second feeding unit 61 may be disposed to be elongated in a front and rear direction Y. The first ground 52 may be spaced apart from the first feeding unit 51 in the front and rear direction Y, and the second ground 62 may be spaced apart from the second feeding unit 61 in the left and right direction X. The spaced direction Y of the first feeding unit 51 and the first ground 52 may be orthogonal to the spaced direction X of the second feeding unit 61 and the second ground 62. The first antenna 5 and the second antenna 6 may have different polarizations. The first antenna 5 may have polarization in the left and right direction X, and the second antenna 6 may have polarization in the front and rear direction Y.

The first ground 52 may be disposed between the first feeding unit 51 and the second antenna 6. The communication module 1 may be disposed in order of the first feeding unit 51, the first ground 52, the ground shield 30, and the second feeding unit 61 in the front and rear direction Y. The first ground 52 may be disposed between the first feeding unit 51 and the second antenna 6, and thus, the spaced distance between the first feeding unit 51 of the first antenna 5 and the second feeding unit 61 of the second antenna 6 may greatly increase.

Figure 2:
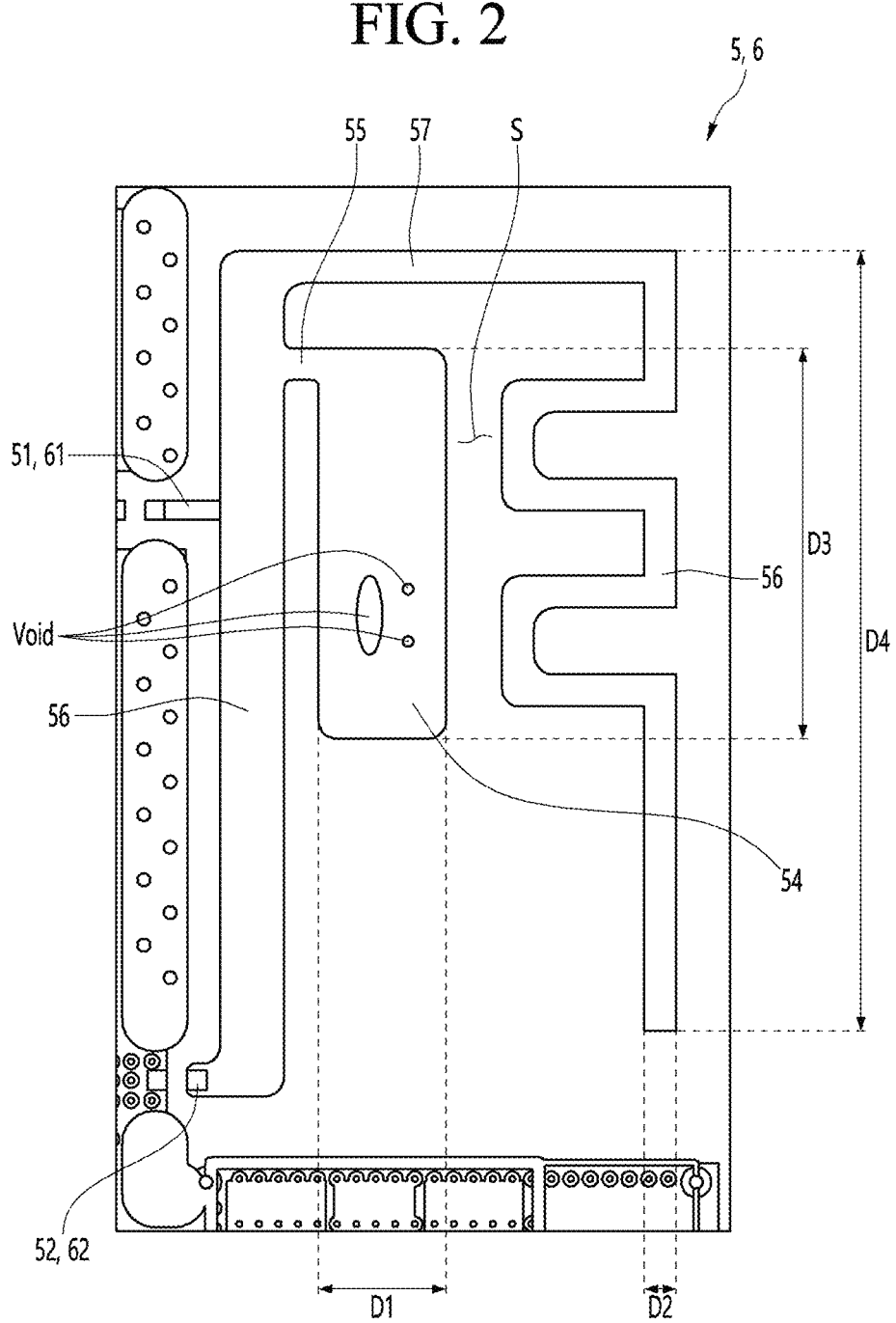
FIG. 2 is a view illustrating a PIFA according to the present embodiment.

FIG. 2 is a view illustrating the PIFA according to the present embodiment.

At least one of the first antenna 5 or the second antenna 6 may be the PIFA, and the PIFA may include the feeding unit and the ground and may further include a high frequency transceiver 54 and a low frequency transceiver 56.

The high frequency transceiver 54 may have a first width D1 and may have a void formed therein. The high frequency transceiver 54 may be provided in a rectangular shape. The high frequency transceiver 54 may be disposed between the main body 20 and the low frequency transceiver 56. The high frequency transceiver 54 may be spaced apart from each of the main body 20 and the low frequency transceiver 56.

The low frequency transceiver 56 may have a second width D2 less than the first width D1. The low frequency transceiver 56 may comprise a zigzag portion provided in a zigzag shape.

The first antenna 5 may comprise a first feeding unit 51, a first ground 52, a high frequency transceiver 54, and a low frequency transceiver 56, and the second antenna 6 may comprise a second feeding unit 61, a second ground 62, a high frequency transceiver 54, and a low frequency transceiver 56. Here, in order to avoid duplicated description of the high frequency transceiver 54 and the low frequency transceiver 56, the same reference numerals will be used.

A fill-cut region S may be defined between the high frequency transceiver 54 and the low frequency transceiver 56. The fill cut region S may be a portion at which a metal forming the first antenna 5 or the second antenna 6 is not formed.

The PIFA may comprise a connecting body 58 in which the high frequency transceiver 54 and the low frequency transceiver 56 are connected through connection portions 55 and 57, respectively. Each of the feeding units 51 and 61 and the grounds 52 and 62 may protrude from the connecting body 58 in a direction opposite to an extension direction of the connection portions 55 and 57.

The feeding units 51 and 61 may emit or receive a signal having a frequency of 2.4 GHz or 5 GHz as portions of a feeding line.

An example of the first width D1 of the high frequency transceiver 54 may be 2 mm, and the high frequency transceiver 54 may be thicker than the second width D2 to operate in a wide bandwidth of 5 GHz to 6 GHz. The three voids may be defined far from the connection portion 55 in a longitudinal direction of the high frequency transceiver 54, and the current path may be diversified to provide a wide bandwidth.

An example of the second width D2 of the low-frequency transceiver 56 may be 0.5 mm, and the low-frequency transceiver 56 may be thinner than the first width D1 to operate in narrow frequency band of 2.4 GHz to 2.5 GHz and minimize a size of the PIFA and a size of the communication module 1.

A total length D3 of the high frequency transceiver 54 may be less than a total length D4 of the low frequency transceiver 56.

Figure 3:
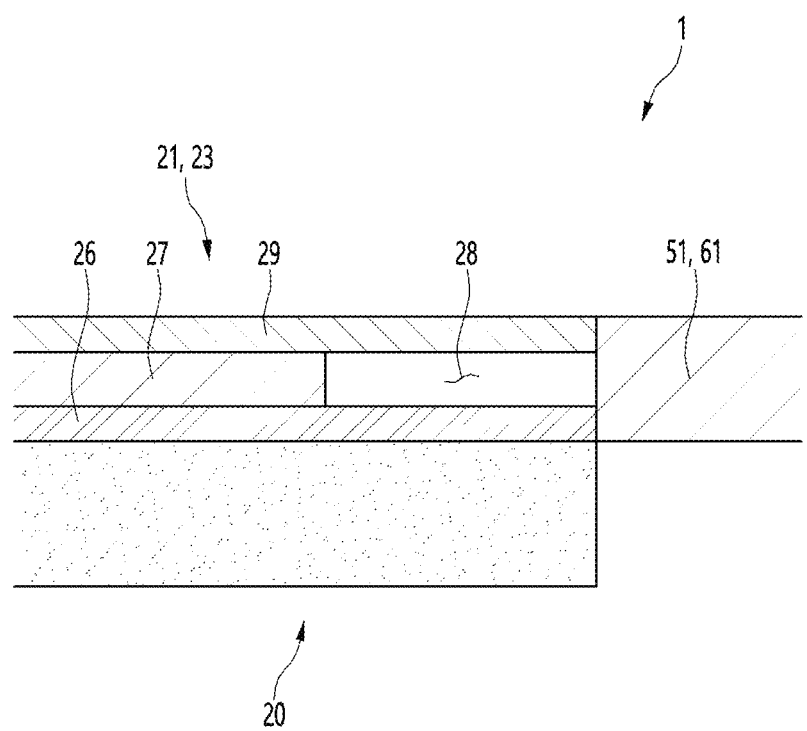
FIG. 3 is a cross-sectional view taken along line A-A of FIG. 1.
Figure 4:
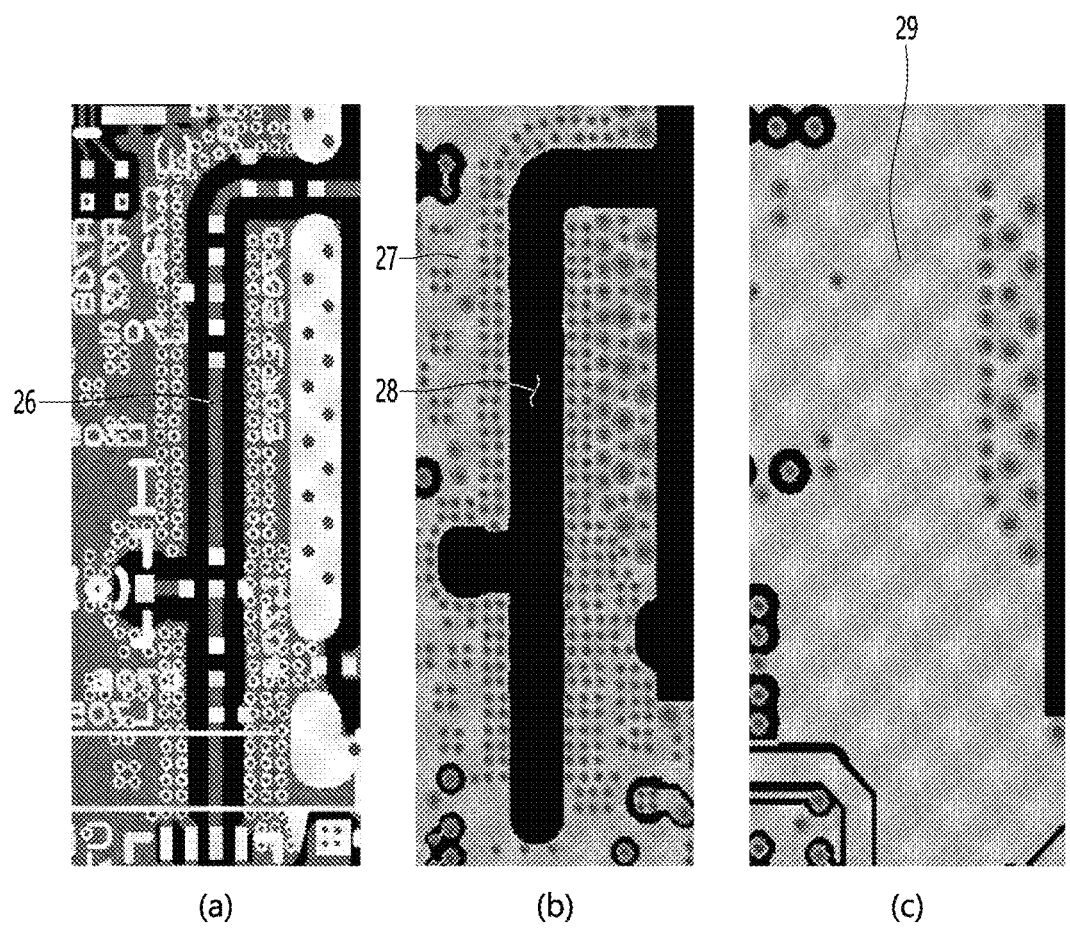
FIG. 4 is a view illustrating a first layer, a second layer, and a third layer illustrated in FIG. 3.
Figure 5:
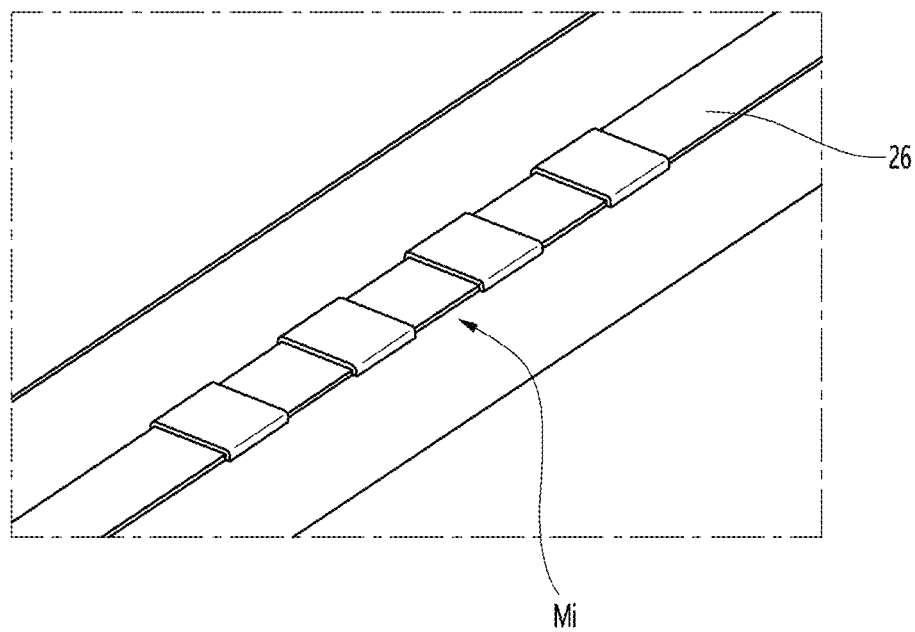
FIG. 5 is a perspective view illustrating the first layer illustrated in FIG. 3.

FIG. 3 is a cross-sectional view taken along line A-A of FIG. 1, FIG. 4 is a view illustrating a first layer, a second layer, and a third layer illustrated in FIG. 3, and FIG. 5 is a perspective view illustrating the first layer illustrated in FIG. 3.

At least one of the first feeding unit connection portion 21 or the second feeding unit connection portion 23 may have a fill-cut microstrip line. The first feeding unit connection portion 21 and the second feeding unit connection portion 23 may have the same structure.

The first feeding unit connection portion 21 and the second feeding unit connection portion 23 may be formed by three layers 26, 27, and 29. Here, the first layer 26 may be a first coating layer as illustrated in FIG. 3 and (a) of FIG. 4, the second layer 27 may be a second coating layer having a void 28 as illustrated in FIG. 3 and (b) of FIG. 4, and third layer 29 may be a third coating layer as illustrated in FIG. 3 and (b) of FIG. 4.

The first layer 26 may be formed on a top surface of a substrate body 25 constituting the substrate 2 by a process such as coating. In the first layer 26, a microstrip line Mi may be formed below the void 28 of the second layer 27.

The second layer 27 may be formed on a top surface of the first layer 26 by a process such as coating.

The third layer 29 may be formed on a top surface of the second layer 27 by a process such as coating.

The void 28 may be defined between the first layer 26 and the third layer 29. Upper and lower sides of the void 28 may be blocked by the first layer 26 and the third layer 29. The void 28 may be defined as a fill-cut area.

The fill-cut microstrip line as described above may improve a transmission output and reception sensitivity.

Figure 6:
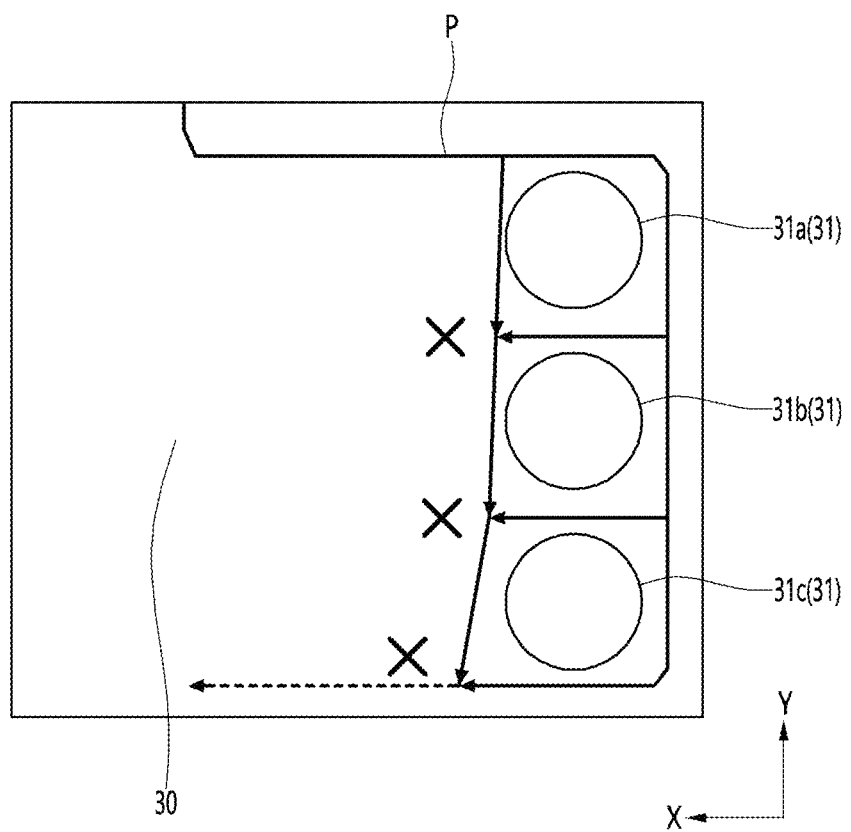
FIG. 6 is a view illustrating a ground shield as another example of the communication module according to the present embodiment.

FIG. 6 is a view illustrating a ground shield as another example of the communication module according to the present embodiment.

As illustrated in FIG. 6, in a ground shield 30, a plurality of holes 31a, 31b, and 31c may be defined to be spaced apart from each other. The plurality of holes 31a, 31b, and 31c may be arranged in a line.

When the plurality of holes 31a, 31b, and 31c are disposed in the ground shield 30, a current path may be further diversified, and a degree of isolation of each of a first antenna 5 and a second antenna 6 may be improved. A plurality of holes 31a, 31b, 31c may be disposed in an edge portion 34 of the ground shield 30, and a path 9 through which current moves around the holes 31a, 31b, and 31c may be formed. The edge portion 34 of the ground shield 30 may be defined as a region of the ground shield 30, which is close to the edge 33.

Figure 7:
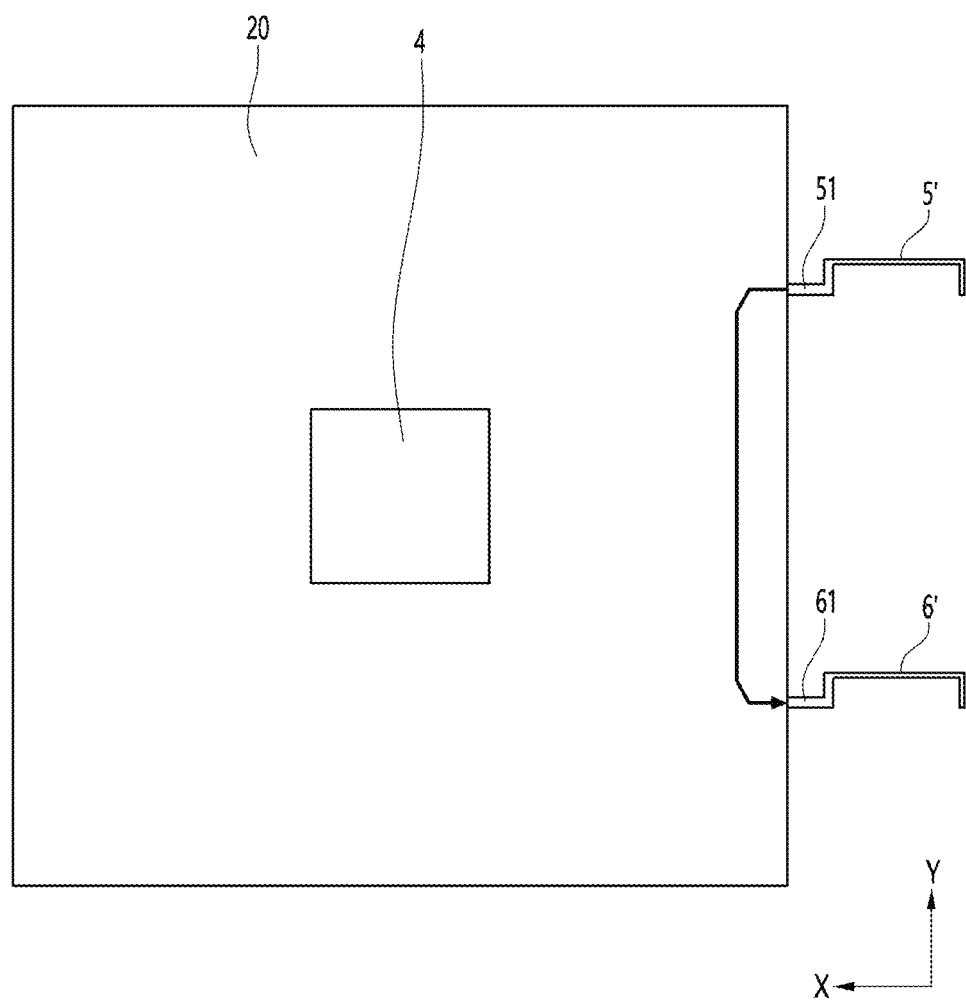
FIG. 7 is a view illustrating a comparative example compared to the present embodiment.
Figure 8:
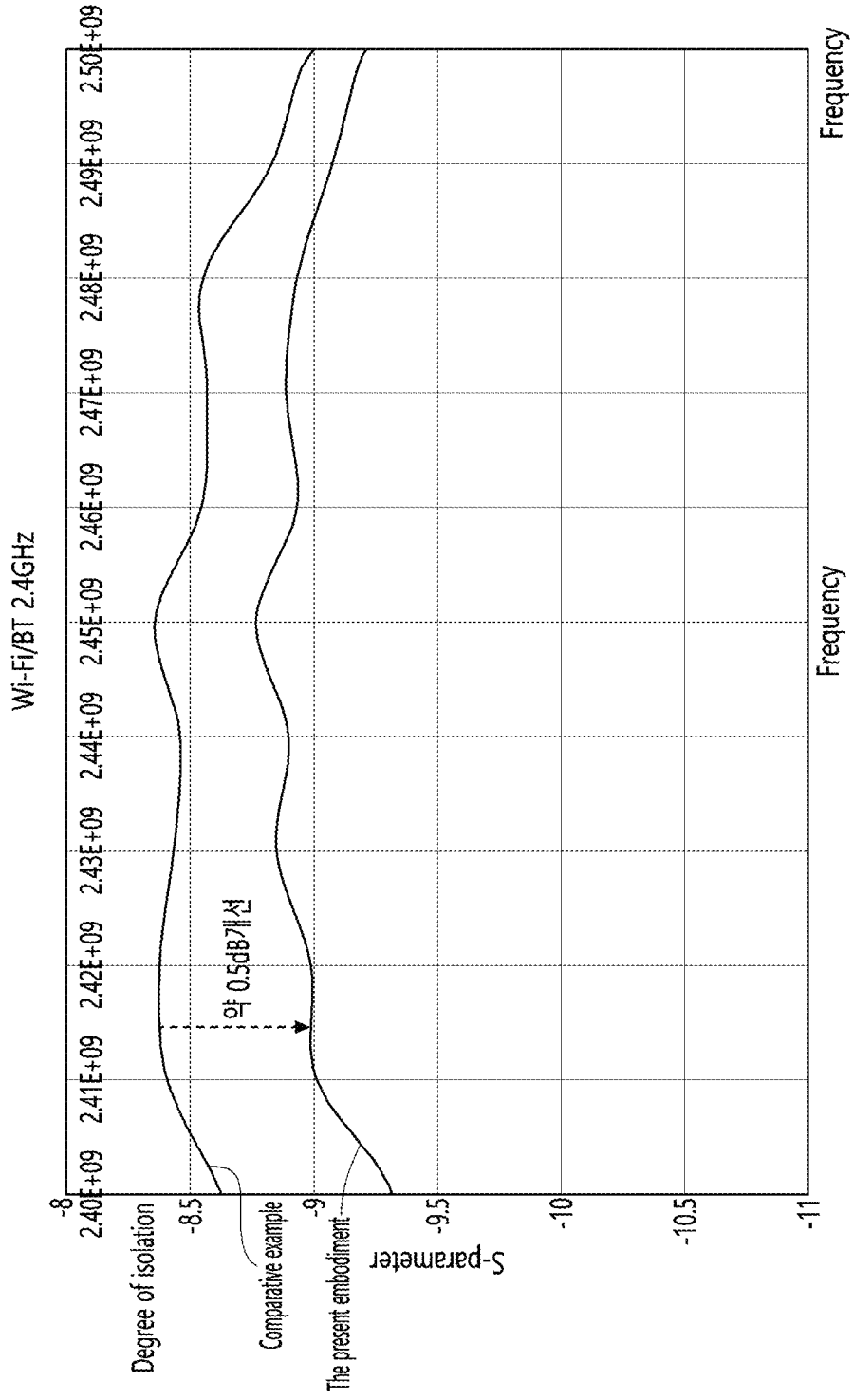
FIG. 8 is a graph illustrating a degree of isolation between a first antenna and a second antenna of the communication module according to the present embodiment.
Figure 9:
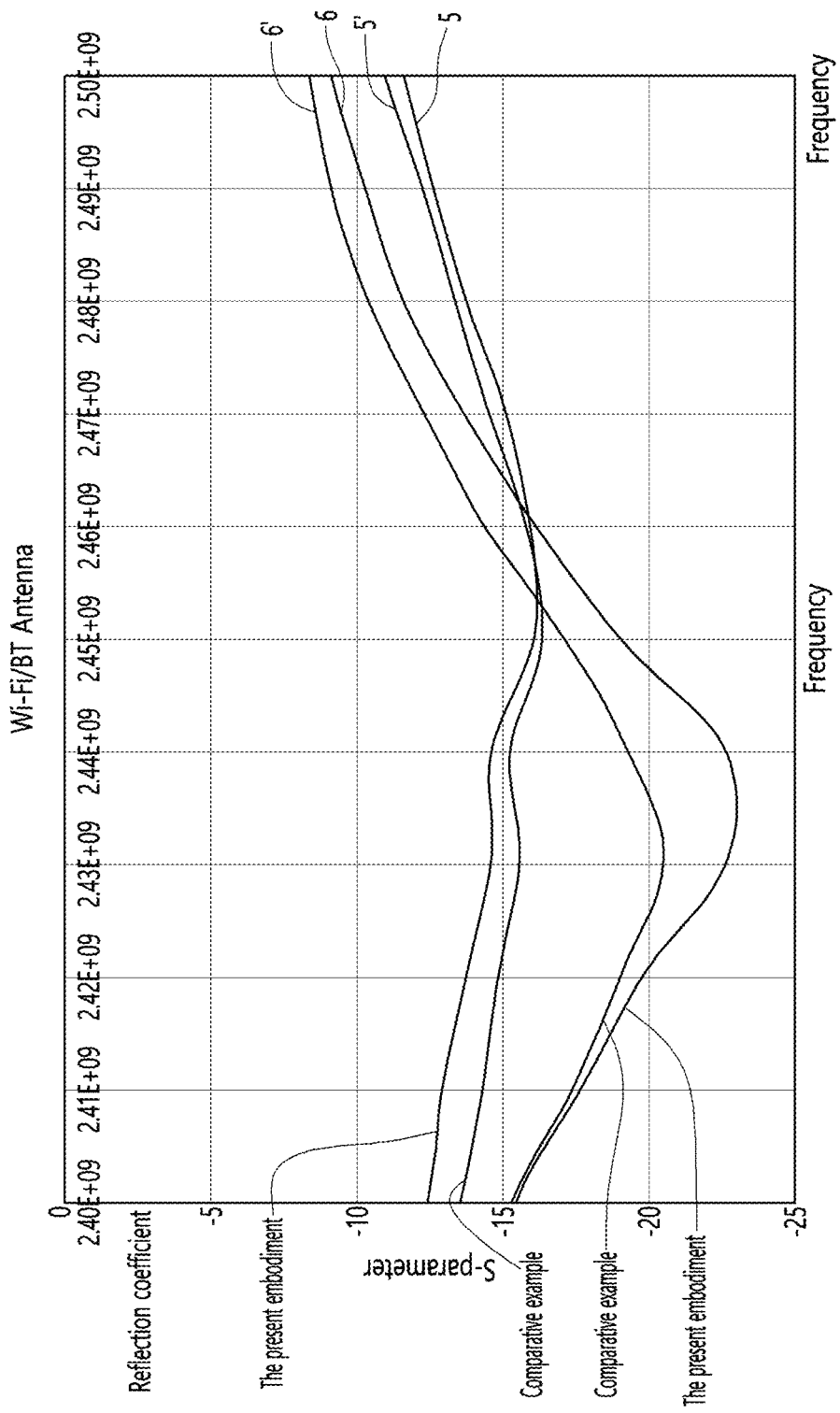
FIG. 9 is a graph illustrating a reflection coefficient of each of the first antenna and the second antenna of the communication module according to the present embodiment.

FIG. 7 is a view illustrating a comparative example compared to the present embodiment, and FIG. 8 is a graph illustrating a degree of isolation between a first antenna and a second antenna of the communication module according to the present embodiment.

In the comparative example, a ground shield 30 and a hole 31 are not formed, and a first antenna 5' and a second antenna 6' are connected together to a main body 20.

A degree of isolation (S-parameter) may be defined as a magnitude or level of a signal input into a second feeding unit 61 when the signal flows through the first feeding unit 51 or defined as a magnitude or level of a signal input into a first feeding unit 51 when the signal flows through the second feeding unit 61. A communication module 1 may preferably have a minimum degree of isolation.

Referring to FIG. 7, the degree of isolation in a narrow frequency band of 2.4 GHz to 2.5 GH according to the present embodiment may be less 0.5 dB than that of isolation in a frequency band of 2.41 GHz to 2.42 GHz according to the comparative example, and thus, the degree of isolation according to the present embodiment may be improved compared to that according to the comparative example.

When mutual coupling between the two antennas 5 and 6 interferes with each other, mutual wireless signals may act as an interferer, and thus, Rx sensitivity performance may be deteriorated. In the case of the present embodiment, since the degree of isolation is lower than that according to the comparative example, the interference between the two antennas 5 and 6 may be minimized to minimize the phenomenon in which the mutual wireless signals acts as the interferer.

FIG. 8 is a graph illustrating a reflection coefficient of each of the first antenna and the second antenna of the communication module according to the present embodiment.

The reflection coefficient may be defined as an amount or level of a signal, which is transmitted from each of the antennas 5, 5', 6, and 6' and then is input again to the antenna after the signal is blocked around the antenna.

As illustrated in FIG. 8, the reflection coefficient of the first antenna 5 may not be significantly different from that of the first antenna 5' according to the comparative example, and the reflection coefficient of the second antenna 6 may not be significantly different from that of the second antenna 6' according to the comparative example. Therefore, in the present embodiment, it may be confirmed that the reflection coefficients of the antennas 5 and 6 are not significantly affected.

The above-disclosed subject matter is to be considered illustrative, and not restrictive, and the appended claims are intended to cover all such modifications, enhancements, and other embodiments, which fall within the true spirit and scope of the present invention.

Thus, the embodiment of the present invention is to be considered illustrative, and not restrictive, and the technical spirit of the present invention is not limited to the foregoing embodiment.

Therefore, the scope of the present invention is defined not by the detailed description of the invention but by the appended claims, and all differences within the scope will be construed as being included in the present invention.

What is claimed is:

1. A communication module comprising:
    a substrate;
    a main body disposed on the substrate;
    a ground shield protruding from the main body;
    at least one communication chip installed on the main body;
    a first antenna including a first feeding unit and a first ground, the first feeding unit and the first ground being connected to the main body; and
    a second antenna including a second feeding unit and a second ground, the second feeding unit and the second ground being connected to the main body, the second antenna being spaced apart from the first antenna,
    wherein a hole is defined in the ground shield and positioned between the first antenna and the second antenna, and
    wherein the hole is configured to modify a current path through the ground shield to increase isolation between the first antenna and the second antenna.

2. The communication module of claim 1, wherein the first feeding unit and the second feeding unit are arranged perpendicular to each other.

3. The communication module of claim 1, wherein a direction along which the first feeding unit and the first ground are spaced apart is perpendicular to a direction along which the second feeding unit and the second ground are spaced apart.

4. The communication module of claim 1, wherein the first ground is disposed between the first feeding unit and the second antenna.

5. The communication module of claim 1, wherein at least one of the first antenna or the second antenna comprises a planar inverted-F antenna (PIFA) having a void defined therein.

6. The communication module of claim 1, wherein the main body comprises:
    a first feeding unit connection portion connected to the first feeding unit; and
    a second feeding unit connection portion connected to the second feeding unit,
    wherein at least one of the first feeding unit connection portion or the second feeding unit connection portion comprises a fill-cut microstrip line,
    wherein the fill-cut microstrip line comprises:
    a first conductive layer disposed on a top surface of the substrate;
    a second conductive layer having a void therein and disposed on a top surface of the first conductive layer; and
    a third conductive layer disposed on a top surface of the second conductive layer,
    wherein upper and lower sides of the void are blocked by the third conductive layer and the first conductive layer, respectively, to improve transmission output and reception sensitivity.

7. The communication module of claim 1, wherein at least one of the first antenna or the second antenna comprises:
    a high-frequency antenna portion having a first width and a void defined therein; and
    a low-frequency antenna portion having a second width that is less than the first width,
    wherein a fill-cut region is defined between the high-frequency antenna portion and the low-frequency antenna portion.

8. The communication module of claim 1, wherein the hole is located closer to an edge of the ground shield than to a center of the ground shield.

9. The communication module of claim 1, wherein a plurality of holes are defined in the ground shield and are spaced apart from each other.

10. The communication module of claim 9, wherein the plurality of holes are arranged in a line.

* * * * *